United States Patent
Danhash

(10) Patent No.: US 8,550,504 B2
(45) Date of Patent: Oct. 8, 2013

(54) FLUID FITTING FOR SOFT TUBING

(75) Inventor: May Danhash, Sherman Oaks, CA (US)

(73) Assignee: Designed Metal Connections, Inc., Gardena, CA (US)

( * ) Notice: Subject to any disclaimer, the term of this patent is extended or adjusted under 35 U.S.C. 154(b) by 204 days.

(21) Appl. No.: 13/028,975

(22) Filed: Feb. 16, 2011

(65) Prior Publication Data

US 2012/0205910 A1    Aug. 16, 2012

(51) Int. Cl.
*F16L 13/14* (2006.01)

(52) U.S. Cl.
USPC .............. 285/382.1; 285/382.2; 285/256

(58) Field of Classification Search
USPC .......... 285/256, 382.1, 382.2, 382.7; 29/508, 29/516, 505, 521, 509
See application file for complete search history.

(56) References Cited

U.S. PATENT DOCUMENTS

| | | | |
|---|---|---|---|
| 3,498,648 A * | 3/1970 | Hallesy | 285/343 |
| 3,674,292 A * | 7/1972 | Demler, Sr. | 285/256 |
| 3,877,735 A * | 4/1975 | Demler, Sr. | 285/382.1 |
| 4,061,367 A | 12/1977 | Moebius | |
| 4,598,938 A * | 7/1986 | Boss et al. | 285/382.2 |
| 4,626,001 A | 12/1986 | Lee | 285/94 |
| 4,934,745 A | 6/1990 | Healy | |
| 5,150,925 A | 9/1992 | Yokomatsu et al. | |
| 6,131,964 A | 10/2000 | Sareshwala | |
| 6,324,917 B1 * | 12/2001 | Mack et al. | 73/861.52 |
| 2006/0186666 A1 | 8/2006 | McKay | |

OTHER PUBLICATIONS

International search report and written opinion dated May 23, 2012 issued in corresponding PCT application PCT/US2012/024899 cites the U.S. patents and U.S. patent application publication above.

* cited by examiner

*Primary Examiner* — Aaron Dunwoody
(74) *Attorney, Agent, or Firm* — DLA Piper LLP (US)

(57) ABSTRACT

A fluid fitting for attachment to a tube includes a cylindrical first sleeve having a tapered outer end surface and an inner surface defining an axial bore for receiving the tube. A cylindrical second sleeve creates an annular space for receiving the tube between the first and second sleeves when the second sleeve is placed within the axial bore. The axial bore has substantially equal diameter throughout. A swage ring has a tapered inner surface that axially swages the swage ring to the first sleeve, second sleeve and tube. A first sleeve shoulder restricts axial movement of the swage ring. A first portion protrudes from the inner surface of the first sleeve to restrict axial movement of the second sleeve.

12 Claims, 3 Drawing Sheets

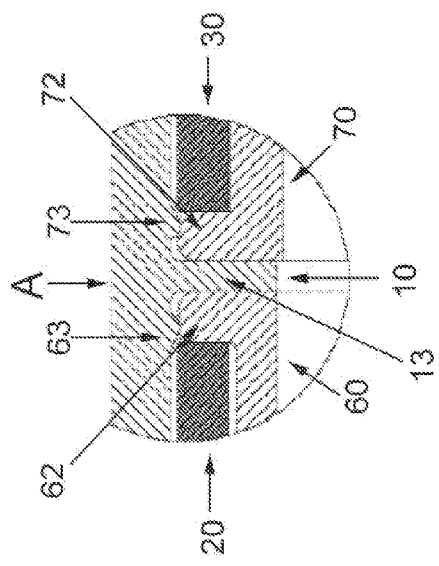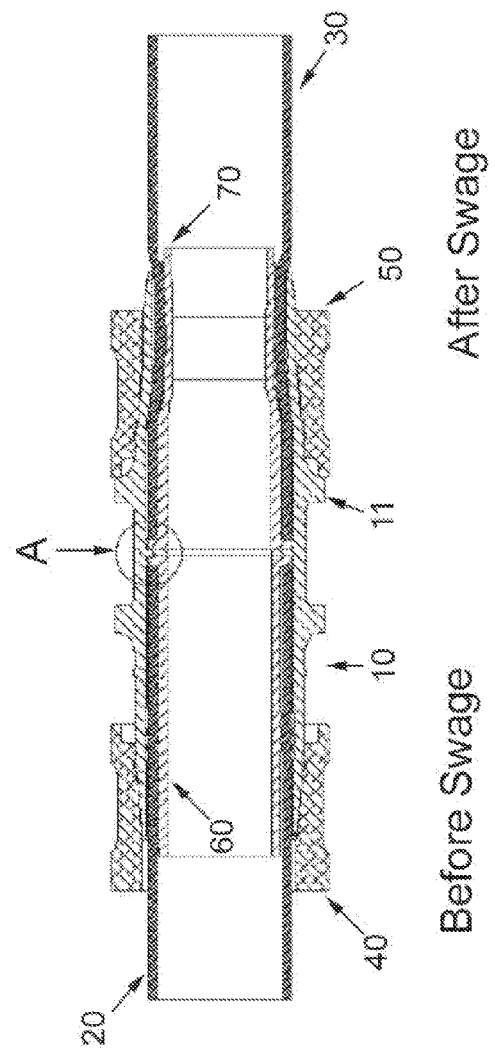

FLUID FITTING FOR SOFT TUBING

BACKGROUND OF THE INVENTION

1. Field of the Invention

This invention relates to a fluid fitting for soft tubing with high temperature capabilities.

2. Description of Related Art

Swaged fittings are commonly used to connect tubes and pipes to each other in areas of fluid systems where a secure connection is critical, such as oxygen or other fluid systems in the aircraft, marine, petroleum and chemical industries. Connected tubes that convey fuel or hydraulic control fluids in an aircraft, for example, must withstand vibration and other adverse conditions without failure. Conventionally, the ends of a tube are inserted into a fitting, usually in the form of a cylindrical sleeve, and the fitting is then swaged with a swaging tool to produce a fluid-tight connection between the tubes. Fittings are commonly used to connect metal tubes to each other in a variety of applications, such as in the aerospace industry to convey fuel, hydraulic control fluids and the like. Conventional fluid fittings, such as those disclosed in U.S. Pat. No. 4,626,001 include telescoping inner and outer sleeves having many variations in inner diameter. However, this structure reduces the laminar flow of fluid. A tube is received at an end secured together by rolling a portion of the outer sleeve around annular ridges of the inner sleeve. A compressive inward force is applied to the conventional fluid fitting to attach the sleeves to the tube, such as through a radial swaging tool.

SUMMARY OF THE INVENTION

The present invention provides a fluid fitting with a high temperature capability for connecting tubes by axially swaging a swaging ring. The fluid fitting includes first and second sleeves and a swage ring. An annular space between the first and second sleeves receives an end of a tube for axial swaging. The inventive fluid fitting advantageously applies an axial swaging force instead of a compressive radial force and is provided in a compact, cost-effective structure.

One embodiment of the invention is a fluid fitting for attachment to a tube including a cylindrical first sleeve having a tapered outer end surface and an inner surface defining an axial bore for receiving the tube. A cylindrical second sleeve creates an annular space for receiving the tube between the first and second sleeves when the second sleeve is placed within the axial bore. The axial bore has substantially equal diameter throughout. A swage ring has a tapered inner surface adapted to axially swage the swage ring to the first and second sleeves and the tube. A shoulder formed on the first sleeve restricts axial movement of the swage ring. A first portion protrudes from the inner surface of the first sleeve to restrict axial movement of the second sleeve. Annular grooves are provided on the inner surface of the first sleeve and an outer surface of the second sleeve. A shoulder formed on the second sleeve is slideable along the inner surface of the first sleeve, and a height of the annular space is equal to a height of the second sleeve shoulder. A second portion protrudes from the inner surface of the first sleeve and holds the second sleeve shoulder in place. An inner surface of the second sleeve defines another axial bore that has a substantially equal diameter throughout. The swage ring is adapted to fit an axial swage tool.

Another embodiment of the invention is a method of attaching a fluid fitting and a tube. A cylindrical second sleeve is inserted into a cylindrical first sleeve having a tapered outer end surface and an inner surface defining an axial bore. The axial bore has substantially equal diameter throughout. The tube is inserted into the first sleeve in an annular space created between the first and second sleeves. A swage ring having a tapered inner surface is slid partway over the first sleeve. The swage ring is axially swaged to the first and second sleeves and the tube. Axial movement of the swage ring is restricted during axial swaging by a shoulder formed on the first sleeve. Axial movement of the second sleeve is restricted by contact with a first portion protruding from the inner surface of the first sleeve. The tube is secured to the first and second sleeves during axial swaging by annular grooves on the inner surface of the first sleeve and an outer surface of the second sleeve. A shoulder formed on the second sleeve is slid along the inner surface of the first sleeve. A height of the annular space is equal to a height of the second sleeve shoulder. The second sleeve shoulder is held in place by a second portion protruding from the inner surface of the first sleeve. An inner surface of the second sleeve defines another axial bore that has a substantially equal diameter throughout.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 3 is a cross-sectional view of the fluid fitting and tubes before and after axial swaging.

FIG. 4 is an exploded cross-sectional view of a portion of FIG. 3.

DETAILED DESCRIPTION OF THE INVENTION

Figure 1:
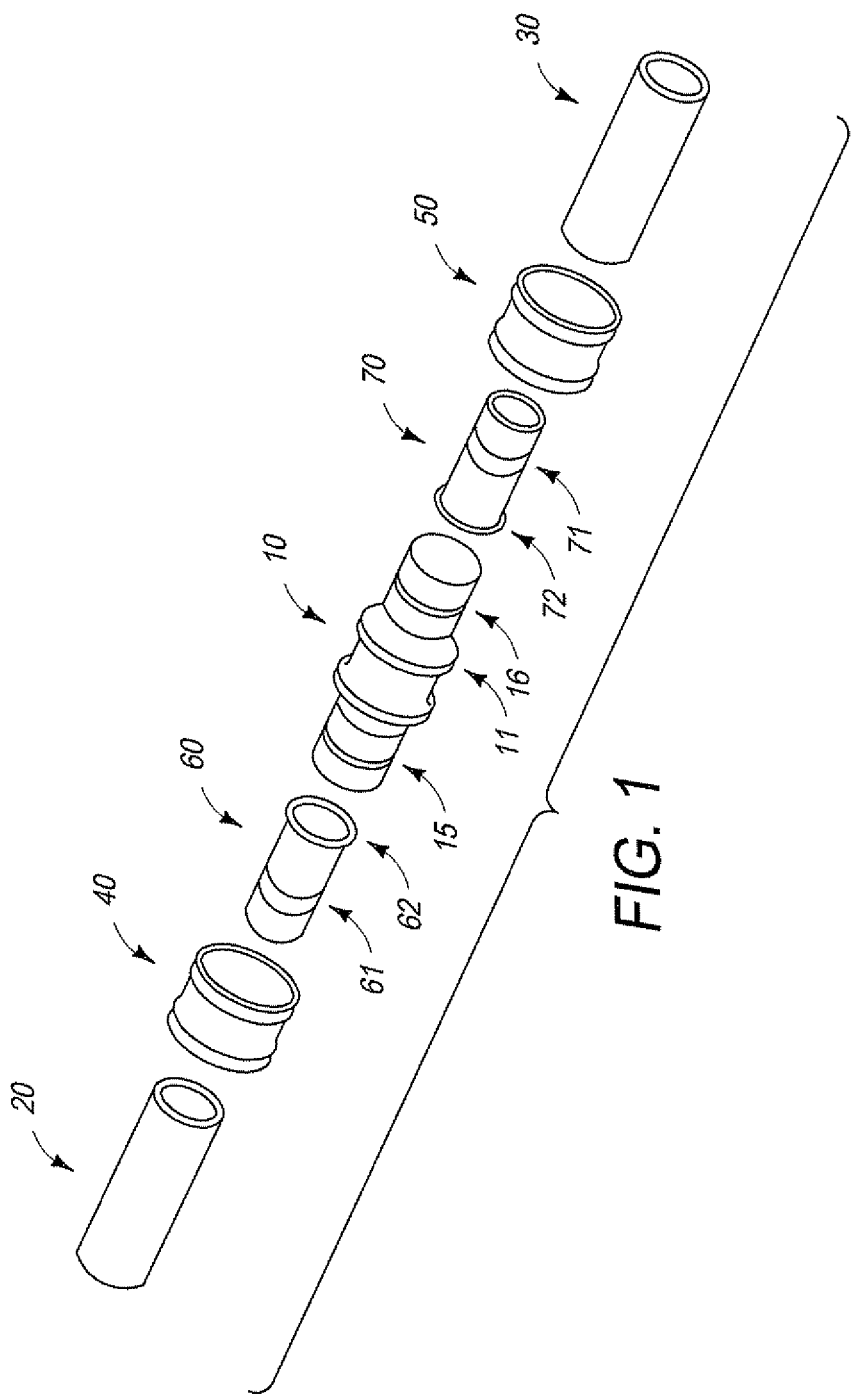
FIG. 1 is a disassembled perspective view of a fluid fitting and tubes according to the invention.

FIG. 1 illustrates a fluid fitting formed of a first sleeve 10 having a substantially cylindrical body and two open cylindrical ends for insertion of corresponding cylindrical second sleeves 60, 70 and tubes 20, 30. The outer surface of first sleeve 10 is adapted to accept a pair of swage rings 50, 60. An inner surface of first sleeve 10 defines an axial bore for receiving second sleeves 60, 70 and tubes 20, 30.

Figure 2:
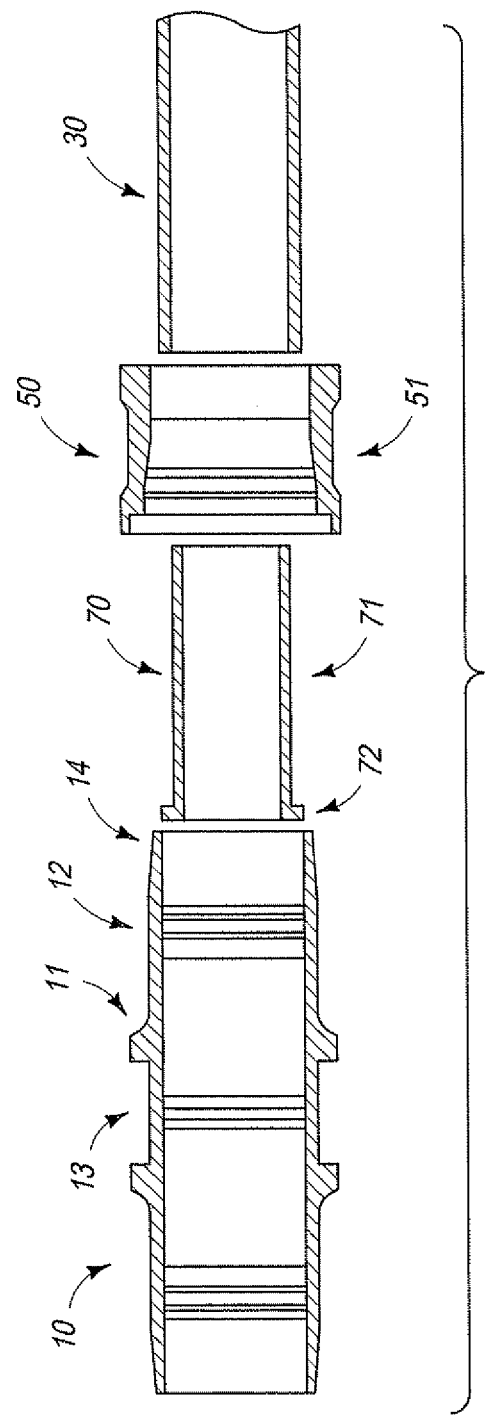
FIG. 2 is an assembled cross-sectional view of the fluid fitting and tubes.

First sleeve 10 has a symmetrical configuration on opposite sides of a first or center portion 13 (FIGS. 2 and 3). Second sleeve 60 and tube 20 are received within first end 15 of sleeve 10. Likewise, second sleeve 70 and tube 30 are received within second end 16 of sleeve 10. Swage ring 40 slides over the exterior of first end 15 and includes a tapered inner surface that contacts and slides over tapered outer end surface 14 of sleeve 10. Likewise, swage ring 50 slides over the exterior of second end 16 and includes a tapered inner surface that contacts tapered outer end surface 14 of sleeve 10 (FIG. 2). Axial movement of swage rings 40, 50 towards first (center) portion 13 of sleeve 10 by an axial swage tool causes rings 40, 50 to apply a radial force to swage sleeve 10 to tubes 20, 30.

First and second ends 15, 16 of sleeve 10 each include a shoulder 11 where sleeve 10 has its greatest diameter. Between shoulders 11 and tapered surfaces 14 are interior annular grooves 12 that bite into tubes 20, 30 upon axial swaging (FIG. 2). Second sleeves 60, 70 include corresponding annular grooves 61, 71 that also bite into tubes 20, 30 upon swaging. First sleeve 10 is secured to tubes 20, 30 both before and after swaging by one or more of grooves 12, which cooperatively engage outer surfaces of tubes 20, 30 and annular grooves on outer surfaces of second sleeves 60, 70 that engage the inner surfaces of tubes 20, 30. The annular grooves prevent axial movement between the first sleeve, second sleeves and tubes after swaging. The grooves on the sleeves also work to hold the tubes in place prior to swaging. Second portions 63, 73 protrude from the inner surface of first sleeve 10 and similarly work to hold second sleeves 60, 70 in place so that second sleeves 60, 70 do not fall out once inserted into first sleeve 10 (FIG. 4).

Annular grooves 12, 61, 71 and portions 63, 73 positively engage and hold tubes 20, 30 in the annular space between the first and second sleeves. When placed in the swage position, the grooves of first sleeve 10 overlap the grooves of second sleeves 60, 70. During swaging, the annular grooves are deformed radially inward. After swaging, the grooves bite into tubes 20, 30 to provide a physical engagement between the sleeves and tubes that resists axial movement, provides smooth axial loading during swaging and increases tube retention capabilities.

Alternatively, depending on the desired application of the fluid fitting, only one of the two ends may be provided in first sleeve 10, along with only one of second sleeves 60, 70 and one of tubes 20, 30. The other end of first sleeve 10 may include an end cap, for example, to close off the end of a tube. Moreover, the fitting may be utilized as a tee, cross-fitting, elbow or reducer, in which case two or more portions of the fitting would connect multiple tubes together.

Second sleeves 60 and 70 include shoulders 62 and 72 that prevent movement of sleeves 60, 70 beyond center portion 13. Shoulders 62, 72 are slideable along the inner surface of first sleeve 10. Center portion 13 protrudes from the inner surface of sleeve 10 to divide first and second ends 15, 16 and provide a backstop within the interior of sleeve 10 for shoulders 62, 72, thereby restricting axial movement of second sleeves 60, 70. Shoulders 62, 72 and sleeves 60, 70 create an annular space for receiving tubes 20, 30 between first sleeve 10 and second sleeves 60, 70 when second sleeves 60, 70 are placed within the axial bore of sleeve 10. The height of shoulders 62, 72 defines the height of the annular space.

FIG. 2 is a cross-sectional view of one side of the fitting. The other side of the fitting has the same structure and is therefore omitted from FIG. 2 to simplify description. The components of the fluid fitting are proportioned such that they fit in each other with diameters increasing in size in the order of second sleeve 70, tube 30, first sleeve 10 and swage ring 50. This configuration allows tube 30 to be swaged between second sleeve 70 and first sleeve 10 through the axial swaging of swage ring 50. Each end of first sleeve 10 includes tapered surface 14. Swage ring 50 includes a tapered inner surface and an outer surface 51 shaped for attachment to an axial swage tool. The axial bores of the first and second sleeves have substantially equal diameter throughout, except for such areas as the annular grooves. Both the construction and assembly of the fluid fitting is thereby simplified.

A pair of rounded exterior shoulders 11 are provided towards the center of first sleeve 10. Shoulders 11 prevent undue stress from being applied onto sleeve 10 by swage ring 50 during swaging and limit axial movement of swage ring 50 over sleeve 10. Center portion 13 protrudes from the interior of sleeve 10 and prevents second sleeves 60, 70 from contacting each other.

FIG. 3 shows the fluid fitting before (left side) and after (right side) swaging. Axial movement of swage rings 40, 50 towards center portion 13 of sleeve 10 causes swage rings 40, 50 to slide over and apply a radial force directly to sleeve 10, which swages sleeve 10 and second sleeves 60, 70 to tubes 20, 30. As shown in FIG. 4, second sleeves 60, 70 are inserted into the interior of first sleeve 10 until shoulders 62, 72 abut opposite sides of center portion or divider 13. Tubes 20, 30 are inserted between first sleeve 10 and second sleeves 60, 70 until the ends of tubes 20, 30 abut shoulders 62, 72. Before swaging, swage rings 40, 50 can be slid partway over sleeve 10 without applying radial force.

As a result of swaging, as shown on the right side of FIG. 3, second sleeve 70, tube 30 and first sleeve 10 are swaged together to form a tight bond. The same of course is true after swaging for second sleeve 60, tube 20 and sleeve 10. Rounded shoulders 11 limits the axial movement of swage rings 40, 50 (see right side of FIG. 3). The force of axial swaging also reduces the interior diameter of sleeve 10 not only at first end 15 (FIG. 3), but also to a lesser degree towards the center of the sleeve (FIG. 4). The frictional engagement between the swaging ring, tube and sleeves at the swaging interface inhibits reverse movement of those components.

Swaging rings 40, 50 may be formed from any suitable material. For example, swaging rings 40, 50 may be constructed from a homogenous material such as copper, brass, stainless steel, Incoloy, aluminum, titanium or the like. Furthermore, swaging rings 40, 50 may be formed of a composite material.

The particular embodiments of the invention described in this document are illustrative and not restrictive. Modification may be made without departing from the spirit of the invention as defined by the following claims.

The invention claimed is:

1. A fluid fitting for attachment to a tube, comprising:
   a cylindrical first sleeve having a tapered outer end surface and an inner surface defining an axial bore for receiving the tube, wherein the axial bore has substantially equal diameter throughout;
   a cylindrical second sleeve that creates an annular space for receiving the tube between the first and second sleeves when the second sleeve is placed within the axial bore, wherein an inner surface of the second sleeve defines another axial bore having a substantially equal diameter throughout;
   annular grooves protruding from the inner surface of the first sleeve and an outer surface of the second sleeve, wherein the annular grooves of the first sleeve and the annular grooves of the second sleeve overlap each other when the second sleeve is placed within the axial bore,
   a second groove protruding from the inner surface of the first sleeve formed prior to insertion of the cylindrical second sleeve, wherein the second groove overlaps a second sleeve shoulder provided on a lengthwise end of the cylindrical second sleeve that protrudes higher from the outer surface of the second sleeve than the annular grooves when the second sleeve is placed within the axial bore first, and the second sleeve shoulder is slideable along the inner surface of the cylindrical first sleeve; and
   a swage ring having a tapered inner surface adapted to axially swage the swage ring to the first sleeve, the second sleeve and the tube.

2. The fluid fitting according to claim 1, further comprising a shoulder formed on the first sleeve that restricts axial movement of the swage ring and the shoulder is rounded prior to axial swaging.

3. The fluid fitting according to claim 1, further comprising a first portion protruding from the inner surface of the first sleeve that restricts axial movement of the second sleeve.

4. The fluid fitting according to claim 1, further comprising a shoulder formed on the second sleeve that is slideable along the inner surface of the first sleeve, wherein a height of the annular space is equal to a height of the second sleeve shoulder.

5. The fluid fitting according to claim 4, further comprising a second portion protruding from the inner surface of the first sleeve and holding the second sleeve shoulder in place.

6. The fluid fitting according to claim 1, wherein the swage ring is adapted to fit an axial swage tool.

7. A method of attaching a fluid fitting and a tube, comprising:
   inserting a cylindrical second sleeve into a cylindrical first sleeve having a tapered outer end surface and an inner surface defining an axial bore, wherein the axial bore has substantially equal diameter throughout;
   inserting the tube into the first sleeve in an annular space between the first and second sleeves;
   securing the tube to the first and second sleeves during axial swaging using annular grooves protruding from the inner surface of the first sleeve and an outer surface of the second sleeve, wherein the annular grooves of the first sleeve and the annular grooves of the second sleeve overlap each other when the second sleeve is placed within the axial bore and using a second groove protruding from the inner surface of the first sleeve formed prior to insertion of the cylindrical second sleeve, wherein the second groove overlaps a second sleeve shoulder provided on a lengthwise end of the cylindrical second sleeve that protrudes higher from the outer surface of the second sleeve than the annular grooves when the second sleeve is placed within the axial bore first, and the second sleeve shoulder is slideable along the inner surface of the cylindrical first sleeve;
   sliding a swage ring having a tapered inner surface partway over the first sleeve; and
   axially swaging the swage ring to the first sleeve, the second sleeve and the tube, wherein an inner surface of the second sleeve defines another axial bore having a substantially equal diameter throughout.

8. The method according to claim 7, further comprising restricting axial movement of the swage ring during axial swaging by a shoulder formed on the first sleeve.

9. The method according to claim 7, further comprising restricting axial movement of the second sleeve by contact with a first portion protruding from the inner surface of the first sleeve.

10. The method according to claim 7, further comprising sliding a shoulder formed on the second sleeve along the inner surface of the first sleeve, wherein a height of the annular space is equal to a height of the second sleeve shoulder.

11. The method according to claim 10, further comprising holding the second sleeve shoulder in place by a second portion protruding from the inner surface of the first sleeve.

12. The method according to claim 7, further comprising fitting the swage ring to an axial swage tool.

* * * * *